March 14, 1939. C. F. BAKE 2,150,709
AUTOMOBILE STEERING WHEEL ATTACHMENT
Filed April 12, 1938
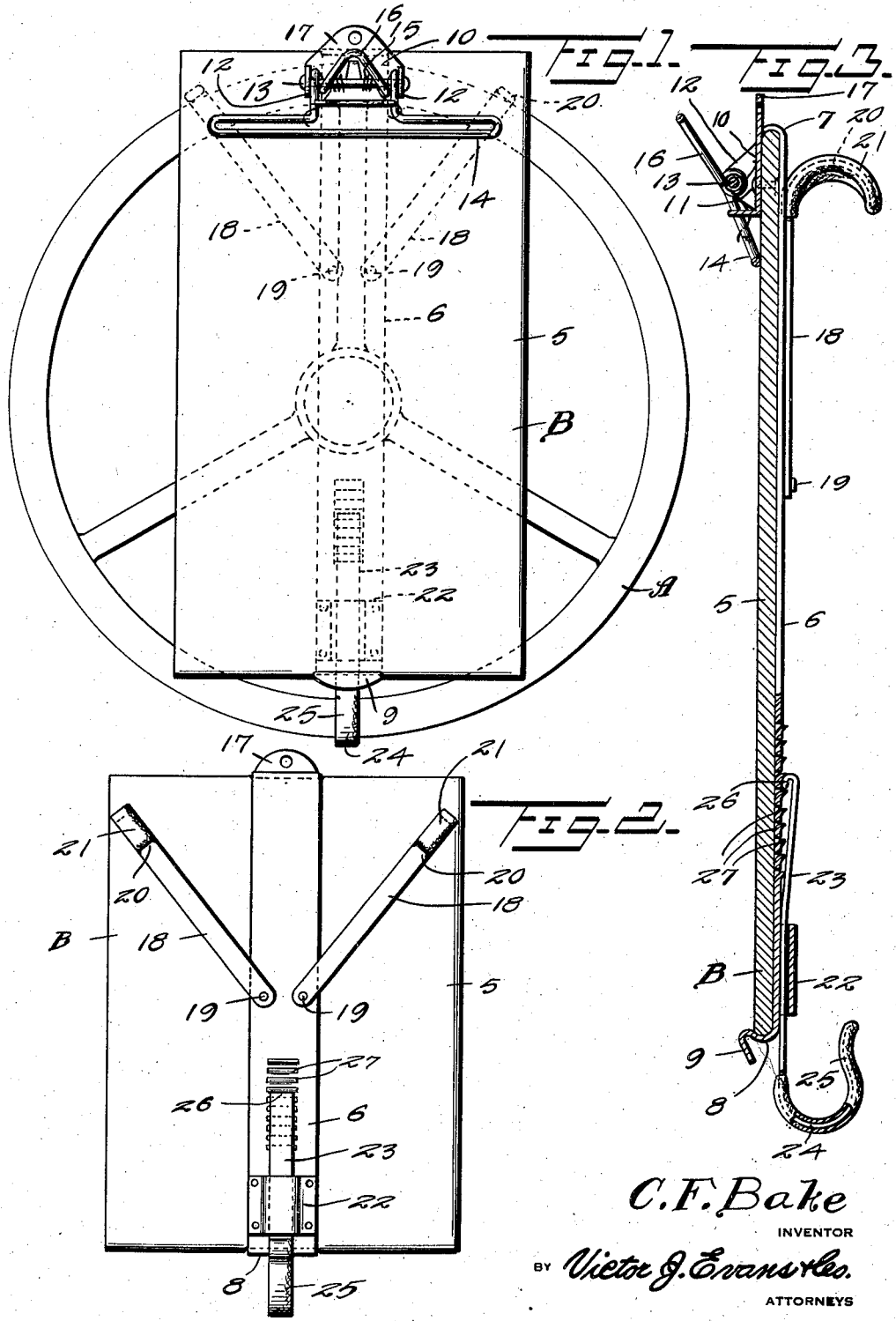
C.F.Bake
INVENTOR
BY Victor J.Evans & Co.
ATTORNEYS Patented Mar. 14, 1939

2,150,709

UNITED STATES PATENT OFFICE 2,150,709

AUTOMOBILE STEERING WHEEL ATTACHMENT

Clarence F. Bake, Fullerton, Nebr., assignor of twenty-four per cent to Willmoth O. Bake, and twenty-five per cent to Lawrence A. Moore, both of Fullerton, Nebr.

Application April 12, 1938, Serial No. 201,612

5 Claims. (Cl. 281—1)

The invention relates to an automobile steering wheel attachment and more especially to a portable writing board for use in automobiles.

The primary object of the invention is the provision of a device of this character, wherein the board constituting a writing board has associated therewith gripping jaws, these being susceptible of adjustment so that the board or bed can be properly positioned upon the steering wheel of a motor vehicle and held fast thereon for use in writing while, further, in association with said board or bed is a paper holder enabling sheets of paper to be written upon or writings to be properly held to avoid displacement thereof or the loss of the same in the use of such device.

Another object of the invention is the provision of a device of this character, wherein the same is susceptible of adjustment to fit varying sizes of steering wheels of motor vehicles and when in position thereon will serve as a writing table, desk or the like and is convenient for use by an operator of the motor vehicle, the device being of novel construction.

A further object of the invention is the provision of a device of this character, which is simple in its construction, thoroughly reliable and efficient in operation, readily and easily applied to and removed from a steering wheel of a motor vehicle and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a plan view of a motor vehicle steering wheel showing the device constructed in accordance with the invention applied thereto.

Figure 2 is a rear elevation thereof.

Figure 3 is an enlarged longitudinal sectional view through the device.

Similar reference characters indicate corresponding parts throughout the several views in the drawing.

Referring to the drawing in detail, A designates generally a steering wheel of a motor vehicle and is of conventional construction while B denotes generally the device constituting the present invention and hereinafter fully described.

The device B constituting the present invention comprises a flat-faced board, plate or the like 5 preferably made from wood although it may be made from sheet metal or any other suitable material and in this instance is of substantially rectangular shape although it may be of any other form. The board, plate or the like 5 is fitted in a holder which comprises a saddle piece in the form of an elongated strip 6 of metal having the outwardly and inwardly bent or curled terminals 7 and 8, respectively, these being effective as clips for engaging about the opposite end edges of the board, plate or the like 5 for the fastening of the same in the holder, the terminal 8 being inherently resilient and is formed with a finger-engaging nib 9 so that it can be distorted or sprung to release the board, plate or the like 5 from the holder when desired.

The board, plate or the like 5 at the writing face side thereof, preferably at the uppermost end of the same, has arranged thereon a paper clamp including a base piece 10 riveted or otherwise fastened at 11 in place upon the board, plate or the like and has outstanding therefrom pivot bearings 12 carrying a pivot pintle 13 swingingly supporting a hand-releasable spring-tensioned jaw 14, the tensioning spring therefor being indicated at 15 and is associated with the said jaw and pivot 13. This jaw 14 is formed from a length of wire bent to provide a finger-engaging lever 16 so that the jaw can be manually operated against the resistance of the spring for the releasing of paper to be written upon or writing superimposed upon the board, plate or the like 5.

The piece 10 is formed with a perforated hanger extension 17 so that when the board, plate or the like 5 is removed from the holder it can be suspended on a nail or other hanging medium within a room or other enclosure when not in use.

Pivoted to the saddle strap 6 are swingable arms 18, the pivots therefor being indicated at 19, and these arms at their outer ends are formed with hook-like jaws 20 having thereon coverings 21, which avoid scratching or marring of the steering wheel A when these jaws 20 are engaged therewith. The pivots 19 are disposed at or near the transverse center of the saddle strap 6 and the arms 18 are susceptible of being swung toward or away from each other for the adjustment thereof in the engagement of the same with the wheel A, the engagement of these arms through the jaw ends 20 being shown in Figure 1 of the drawing.

Carried by the saddle strap 6 is a guide 22 slidably accommodating a shiftable arm 23 having at its outer end a hook-like jaw 24 carrying the covering 25 to prevent marring or scratching of the steering wheel A and the inner end of this arm 23 being inherently resilient and is provided with a ratchet acting latching terminal 26 engageable with rack teeth 27 cut and bent from the strap 6 so in this manner the arm 23 can be latched in adjusted position and the jaws 20 and 24, respectively, being engageable about the steering wheel A for the fastening of the saddle or the holder for the board, plate or the like 5 thereon. The adjustment of the holder allows it to be applied to different sizes of steering wheels for the carrying of the board, plate or the like 5 useful as a writing table, desk or the like when in position upon the steering wheel or such board, plate or the like 5 can be removed from the holder and placed upon a table, desk or other support for use independently of such holder or the said board, plate or the like 5 can be hung upon a hanger therefor when not in use and the writings clipped or clamped thereon to avoid the loss of the same and being retained in order.

What is claimed is:

1. The combination of a plate-like section forming a writing bed, a saddle releasably holding said section comprising a strap, a plurality of clamps fitted on said strap, one of the clamps being slidably supported thereon and the remaining clamps swingable relative thereto, jaw terminals formed on the clamps for engagement with the steering wheel, and means for latching the slidable clamp in adjusted position to the strap.

2. The combination of a plate-like section forming a writing bed, a saddle releasably holding said section comprising a strap, a plurality of clamps fitted on said strap, one of the clamps being slidably supported thereon and the remaining clamps swingable relative thereto, jaw terminals formed on the clamps for engagement with the steering wheel, means for latching the slidable clamp in adjusted position to the strap, and means on the section for the detachable fastening of a paper thereto.

3. The combination of a plate-like section forming a writing bed, a saddle releasably holding said section comprising a strap, a plurality of clamps fitted on said strap, one of the clamps being slidably supported thereon and the remaining clamps swingable relative thereto, jaw terminals formed on the clamps for engagement with the steering wheel, means for latching the slidable clamp in adjusted position to the strap, means on the section for the detachable fastening of a paper thereto, and protective means covering the jaws.

4. The combination of a plate-like section forming a writing bed, a saddle releasably holding said section comprising a strap, a plurality of clamps fitted on said strap, one of the clamps being slidably supported thereon and the remaining clamps swingable relative thereto, jaw terminals formed on the clamps for engagement with the steering wheel, means for latching the slidable clamp in adjusted position to the strap, means on the section for the detachable fastening of a paper thereto, protective means covering the jaws, and a guide on the strap for the sliding clamp.

5. The combination of a plate-like section forming a writing bed, a saddle releasably holding said section comprising a strap, a plurality of clamps fitted on said strap, one of the clamps being slidably supported thereon and the remaining clamps swingable relative thereto, jaw terminals formed on the clamps for engagement with the steering wheel, means for latching the slidable clamp in adjusted position to the strap, means on the section for the detachable fastening of a paper thereto, protective means covering the jaws, a guide on the strap for the sliding clamp, and a latching rack formed from the strap for the sliding clamp.

CLARENCE F. BAKE.